3,614,897
COUPLING FOR DRIVING INTERMITTENTLY ACTING ROLLING MILL

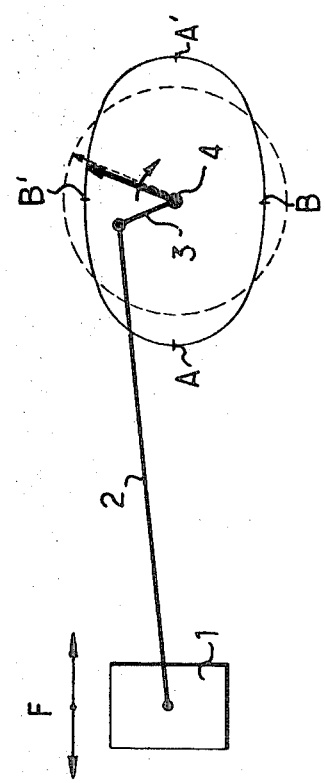
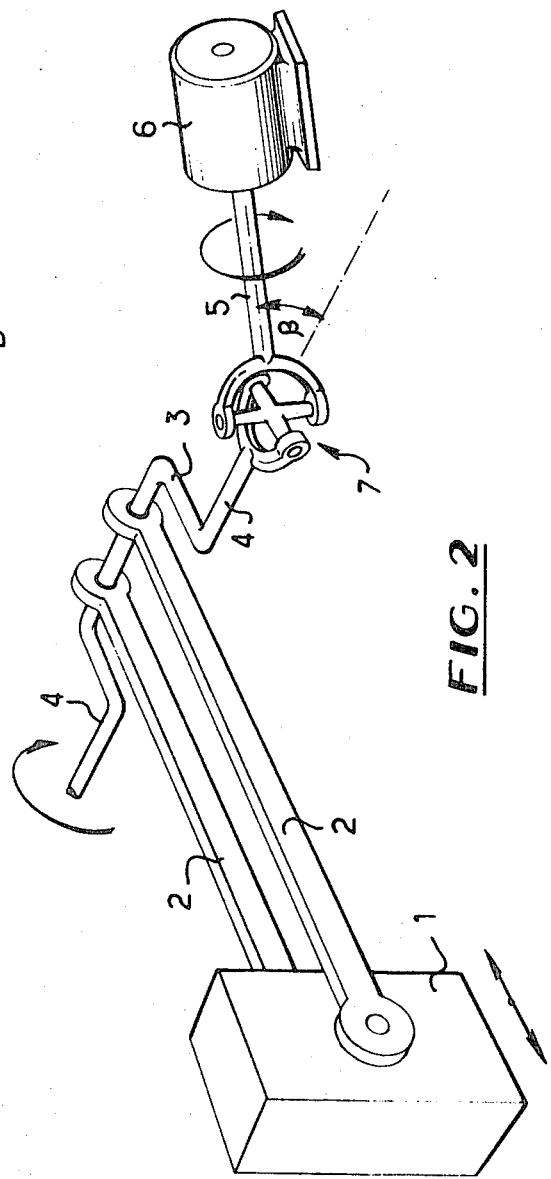
FIG. 1
FIG. 2

Pierre Peytavin, Neuilly-sur-Seine, France, assignor to Societe Anonyme dite: Vallourec (Usines a Tubes de Lorraine-Escaut et Vallourec Reunies), Paris, France
Filed June 19, 1970, Ser. No. 47,261
Claims priority, application France, June 24, 1969, 6921147
Int. Cl. F16h 21/22
U.S. Cl. 74—44                                    2 Claims

ABSTRACT OF THE DISCLOSURE

The crankshaft driving the reciprocating cage of an intermittently acting rolling mill is driven from a constant-speed motor through a universal joint with the motor shaft positioned at an angle to the crankshaft in a plane perpendicular to the plane of reciprocation of the cage, so that cyclical irregularities in the angular speed of the crankshaft due to the mass of the cage are compensated for by complementary irregularities due to the angular drive through the universal joint.

SUMMARY OF THE INVENTION

This invention relates to a coupling adapted to connect a shaft rotating at a constant speed to a shaft having cyclical irregularities in its instantaneous speed of rotation, and which may be used to drive an intermittently acting rolling mill.

In conventional intermittently acting rolling mills the shaft driving the connecting rods for the roller cage turns at a speed which is constant if only the number rotations in a unit period of time is considered, but which is not constant if the instantaneous speed at different angular positions of the shaft is taken into account. It is this type of rotation which is herein referred to as "rotation comprising cyclical irregularities."

This phenomenon is due to the fact that in these rolling mills the cage and the connecting rods have substantial masses to which an alternating movement is imparted by a connecting rod driven from the crankshaft.

The present invention proposes to provide an economical coupling for intermittently acting rolling mills which is simple in structure and which makes it possible to connect a drive shaft turning at a truly constant speed to a crankshaft turning at a constant speed having cyclical irregularities, and to permanently correct the angular speed of the shaft having the cyclical irregularities so as to make its speed of rotation practically constant.

It is accordingly the object of the present invention to provide as a new article of manufacture a coupling between a drive shaft rotating at a constant speed and the crankshaft of an intermittently acting rolling mill turning at a speed having cyclical irregularities, which device is essentially characterized by the fact that it comprises a universal joint, the two shafts of which are positioned at an angle dependent on the magnitude of the cyclical irregularities which are to be compensated for.

In order to permit compensation for cyclical irregularities, the shaft of the universal joint which is connected to the shaft driven at a constant speed must lie in a plane which passes through the axis of the shaft having cyclical irregularities and which is perpendicular to the plane in which the masses subjected to alternating movement move, which masses are connected by a connecting rod to the shaft which undergoes the cyclical irregularities.

The axis of the drive shaft which turns at constant speed must lie in a vertical plane passing through the axis of the crankshaft which causes the alternate horizontal displacement of the rolling cage.

It is immaterial whether the axis of the device driven at constant speed is inclined upwardly or downwardly.

In accordance with the invention, the angle between the two shafts of the universal joint is a function of the maximum value of the difference between the speed of rotation having cyclical irregularities and the constant speed of rotation so as to cancel out this discrepancy when the cyclical irregularities pass through their maxima or minima.

It has been established that the relatively fragile device consisting of this universal joint is nevertheless entirely satisfactory despite the very substantial forces and irregularities applied to the crankshaft. In an improved embodiment of the invention a second universal joint is positioned between the first universal joint and the drive shaft so as to eliminate the minor cyclical irregularities which may remain. In this case, the second universal joint, which is placed between the first universal joint and the constant speed drive, must be driven at a speed twice that of the first universal joint.

In order that the invention may be better understood one embodiment thereof will now be described, purely by way of illustration and example, with reference to the accompanying drawings on which:

FIG. 1 is a schematic elevational view of a shaft coupled by a crank to an oscillating cage;

FIG. 2 is a schematic view of a coupling according to the invention;

Figure 3:
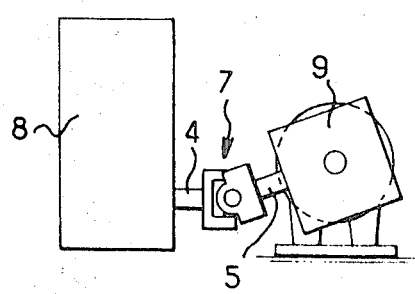
FIG. 3 is a schematic elevational view of an intermittently acting rolling mill according to the invention.

FIG. 1 schematically represents a mass 1 subjected to an oscillating movement in the direction of the double-headed arrow F. This mass 1, consisting of the movable cage of an intermittently acting rolling mill, is connected by a connecting rod 2 to a crank 3 fixed to a shaft 4.

FIG. 1 also shows the circular diagram of the instantaneous speed vector of the shaft 4. This vector is shown in solid lines, as is the trajectory of its end.

The circle corresponding to the average constant speed of rotation is also shown in broken lines.

This demonstrates that during two intervals of time in each complete rotation the instantaneous speed vector is lower than the average speed vector whereas, during the two complementary intervals of time the instantaneous speed vector is greater than the average speed vector.

It will be seen that at the points A and A' (which are positioned on a diameter parallel to the direction of movement of the oscillating mass 1) the instantaneous speed is greatest, since these points correspond to the dead point of mass 1 which then has no kinetic energy.

On the contrary, the points B and B' correspond to the minimum instantaneous speed of the shaft 4, since at this moment the mass 1 passes through a median position and has its greatest speed and conequently its greatest kinetic energy.

The problem to be resolved consists in providing a coupling which makes it possible to connect a shaft such as the shaft 4, which turns at a speed of rotation having cyclical irregularities, as has been explained, to a shaft rotating at a constant speed.

In accordance with the invention this problem is solved by coupling the shaft 4 to the shaft 5 of a motor 6 (which turns at a constant speed of rotation) through a universal joint 7 (FIG. 2).

The presence of the universal joint 7 makes it possible to provide the coupling sought, for it has been established that, in a surprising manner, the irregularities which are introduced by the joint itself make it possible to compensate in a substantially permanent manner for the cyclical irregularities which have been described above. For this purpose it suffices to choose the angle $\beta$ between the two shafts of the universal joint so as to cancel out the maximum values of the cyclical irregularities.

Figure 5:
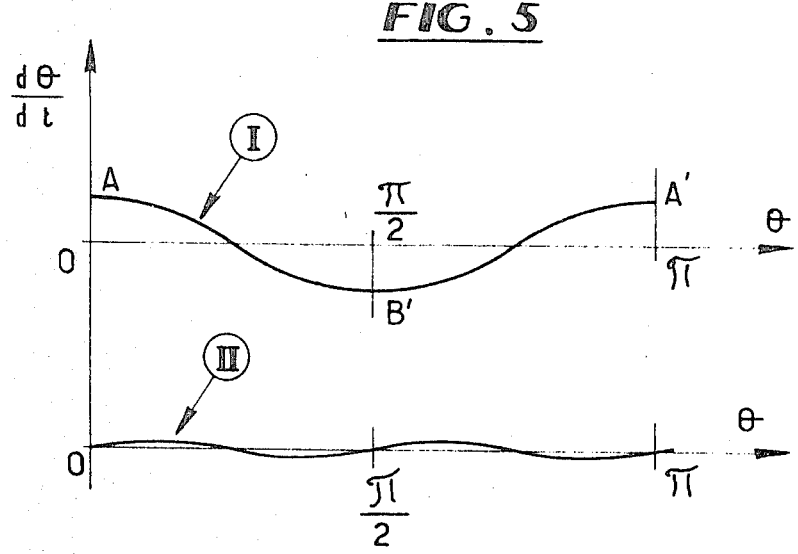
FIG. 5 is a diagram showing the variations in the angular speed of the shafts on the two sides of the coupling according to the invention.

FIG. 5 shows the curve I which represents, as a function of the angle of rotation $\theta$ of the shaft 4 the variation of the instantaneous angular speed $d\theta/dT$ in proportion to the average value of this speed, that is to say in proportion to the constant speed of the shaft for driving purposes.

This diagram shows the positions of the points A, B', and A' of FIG. 1 for ½ a revolution.

FIG. 5 also shows the curve II which represents the instantaneous speed $d\theta/dT$ of the shaft 5 by which the universal joint 7 is connected to the motor 6.

It will be noted that this curve II is extremely close to the abscissa, which amounts to saying the instantaneous speed of the shaft 5 has only minor cyclical irregularities.

It will also be noted that the angle $\beta$ between the two shafts of the universal joint has been so selected as to completely cancel the differences between the instantaneous speed and the average speed for the points A, B' and A'. It follows that the instantaneous speed of the shaft 5 is subjected only to fluctuations which are much smaller in size, in general of the order of several percent of those which would otherwise disturb the regularity of rotation of the shaft 4. Moreover, these residual irregularities have twice the frequency.

When it is desired to completely eliminate the small cyclical irregularities which still remain, it suffices to position on the shaft 5 a reducer, the other shaft of which turns at a speed of rotation twice as great, and is connected to the shaft of the motor 6 by a second universal joint, the angular spacing between these shafts being selected so as to cancel the maximum values of the differences in speed shown on curve II of FIG. 5.

This results in a speed of rotation which is free of substantial cyclical irregularities.

Figure 4:
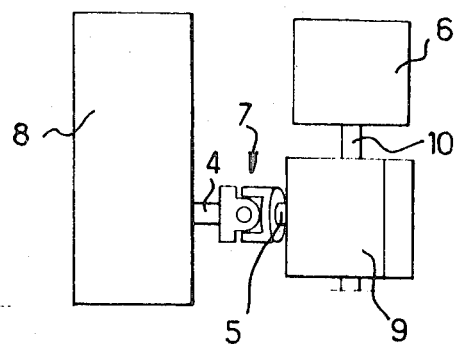
FIG. 4 is a top plan view corresponding to FIG. 3.

FIGS. 3 and 4 are a rear elevation and a top plan view of a device for driving an intermittently driven rolling mill.

On these figures reference numeral 8 schematically represents the frame which contains the crankshaft which reciprocates the cage through the connecting rods. This crankshaft may be simple, or may consists of two crankshafts turning synchronously in opposite directions.

FIGS. 3 and 4 also show the universal joint 7, the shaft 5 of which is upwardly inclined, whereas the shaft 4 which connects it to the crankshaft is horizontal. A speed reducer 9, which is connected to the shaft 5, is coupled to the driving motor 6.

It will be seen that it is possible in this way to couple by an extremely simple means a rolling mill motor 6 turning at a practically constant speed, to a shaft 5 of the crankshaft which is subjected to substantial cyclical irregularities in its instantaneous speed.

The use of the universal joint 7 makes it unnecessary to use flexible coupling sleeves.

Moreover, it should be noted that the compensation for the cyclical irregularities in the instantaneous speed of the shaft 4 is uniquely a function of the angular spacing $\beta$ between the two shafts of the universal joint, and is in no way dependent upon the speed of rotation of the shaft 4.

It will of course be appreciated that the embodiment which has been described has been given purely by way of illustration and example and may be modified as to detail without thereby departing from the basic principles of the invention, as defined by the following claims.

What is claimed is:

1. In a rolling mill comprising a reciprocating cage from a crankshaft through a connecting rod, and a motor driving said crankshaft through a drive shaft, the improvement according to which said drive shaft is coupled to said crankshaft through a universal joint and lies at an angle to said crankshaft and defines therewith a plane substantially perpendicular to the direction in which said connecting rod reciprocates said cage, said angle being such as to cause cyclical irregularities in the instantaneous angular speed of said crankshaft sufficient to substantially offset the cyclical irregularities in said speed resulting from the mass of said cage and connecting rod.

2. Device as claimed in claim 1 in which said angle is selected so that the maximum irregularity introduced by said drive shaft is equal to the maximum irregularity caused by said mass.

References Cited

Shigley, J. E., Theory of Machines, McGraw-Hill Co., Inc., New York, 1961.

WILLIAM F. O'DEA, Primary Examiner

P. D. FERGUSON, Assistant Examiner